(12) United States Patent
Chang et al.

(10) Patent No.: US 7,061,701 B2
(45) Date of Patent: Jun. 13, 2006

(54) COLOR WHEEL

(75) Inventors: Chih-Neng Chang, Taipei (TW); Chih-Huang Wang, Shulin (TW)

(73) Assignee: Prodisc Technology Inc., Taipei Hsien (TW)

( * ) Notice: Subject to any disclaimer, the term of this patent is extended or adjusted under 35 U.S.C. 154(b) by 0 days.

(21) Appl. No.: 10/952,886

(22) Filed: Sep. 30, 2004

(65) Prior Publication Data

US 2006/0066969 A1  Mar. 30, 2006

(51) Int. Cl.
*G02B 5/22* (2006.01)
*G02B 7/00* (2006.01)

(52) U.S. Cl. .................. 359/892; 359/885; 359/891; 348/743; 356/418; 353/84; 362/293

(58) Field of Classification Search ............ 359/891, 359/892, 885, 889; 348/743; 356/418; 353/84; 362/293, 322, 323
See application file for complete search history.

(56) References Cited

U.S. PATENT DOCUMENTS

| | | | |
|---|---|---|---|
| 6,604,830 B1 * | 8/2003 | Chiu et al. ............... | 353/84 |
| 6,618,214 B1 * | 9/2003 | Sung et al. ............... | 359/892 |
| 6,715,887 B1 * | 4/2004 | Chang ..................... | 353/84 |
| 2004/0233279 A1 * | 11/2004 | Chang et al. ............ | 348/125 |

\* cited by examiner

*Primary Examiner*—Leonidas Boutsikaris
(74) *Attorney, Agent, or Firm*—Birch, Stewart, Kolasch & Birch, LLP

(57) ABSTRACT

A color wheel includes a motor, a covering element and a color filter. In this case, the motor has a housing and a motor body. The motor body has a central axis and the housing is set at one side of the motor body. The housing has a surface, which is opposite to the motor body. The housing and the motor body rotate around the central axis. The covering element covers one part of the housing. The color filter is set around the covering element.

8 Claims, 3 Drawing Sheets

COLOR WHEEL

BACKGROUND OF THE INVENTION

1. Field of Invention

The invention relates to a color wheel and more particularly to a color wheel, which is used for preventing oil leaking.

2. Related Art

Currently, image projection systems have become popular items in the optoelectronic industry owing to multiple requirements of a system having large display area, small dimension, and thin, light composition. Thus, with the modern technology, only plasma display and projection system can fit the needs. However, due to the high price of the plasma display, the projection system becomes the priority choice in the market.

The popular projection systems are divided into three types including a liquid crystal display (LCD) type, a liquid crystal on silicon (LCOS) type, and a digital light processing (DLP) type, wherein the LCoS and DLP types have a simplified system and use a color wheel for providing color separation mechanism. The following description will take the DLP type projection system as an example.

In a DLP projector, a digital control method and a light reflection principle are adopted. First, light rays are integrated or converged by a light integration rod and then pass through the color filter of the color wheel, which splits the light rays. The split light rays are then projected onto a digital micro-mirror device (DMD). In this technology, the DMD is used to replace the liquid crystal panel for representing images in the conventional liquid crystal projector. Since the DMD includes several movable micro-mirrors, driving electrodes may control the tilt angle and deflection time of each movable mirror. Then, the light rays may be projected to form an image by switching the reflection directions of the light rays.

As shown in FIG. 1, in a projection system 1, a color wheel 11 has to rotate at high speed, so a motor 112 rotating the color filter 111 has a high operation temperature. However, since the housing 1121 of the motor 112 is riveting to the axis 1122, the oil in the motor 112 would leak or diffuse through the riveting point and then condense on the color filter 111. In more details, the oil is provided to lubricate the bearing of the motor. When the temperature is raised caused by the operation of the color wheel, the oil may be evaporated. The evaporated oil may diffuse through the leak of the riveting point and then attach to the color filter 111. Since the temperature of the color filter 111 is lower than the inside of the motor 112, the evaporated oil condenses on the color filter 111 so as to form white mist oil thereon. The white mist oil attaching on the color filter 111 would affect the light path and influence the image quality of the project system 1. In addition, the color wheel 11 may include glue or adhesive, which is made of polymers. The glue or adhesive may also generate some outgased chemicals due to the high operation temperature, and affect the light path and influence the image quality according to the above-mentioned mechanism.

It is therefore a subjective of the invention to provide a color wheel to solve the above-mentioned problems.

SUMMARY OF THE INVENTION

In view of the foregoing, the invention is to provide a color wheel, which can prevent of oil leaking.

To achieve the above, a color wheel of the invention includes a motor, a covering element and a color filter. In this invention, the motor has a housing and a motor body. The motor body has a central axis and the housing is set at one side of the motor body. The housing has a surface opposite to where the housing set at the side of the motor body. The housing and the motor body rotate around a central axis. The covering element is set on the housing. The color filter is set around the covering element.

To achieve the above, a color wheel of the invention includes a motor, a ring-shaped cover plate and a color filter. In this invention, the motor has a housing and a motor body. The motor body has a central axis and the housing is set at one side of the motor body. The housing has a surface opposite to where the housing set at the side of the motor body. The housing and the motor body rotate around a central axis. The ring-shaped cover plate is set on the housing. The color filter is bonded to the ring-shaped cover plate and the ring-shaped cover plate is set between the motor and the color filter.

As mentioned above, the color wheel of the invention has the covering element or the ring-shaped cover plate to prevent oil leaking to the color filter to affect the normal operation of the color wheel and further avoid influences to the image quality. In addition, the absorbing element in the invention can ensure that the oil would not leak to the color filter. Thus, the invention can ensure the reliability of the color wheel and the image quality of the system.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow illustration only, and thus is not limitative of the present invention, and wherein.

DETAILED DESCRIPTION OF THE INVENTION

Figure 1:
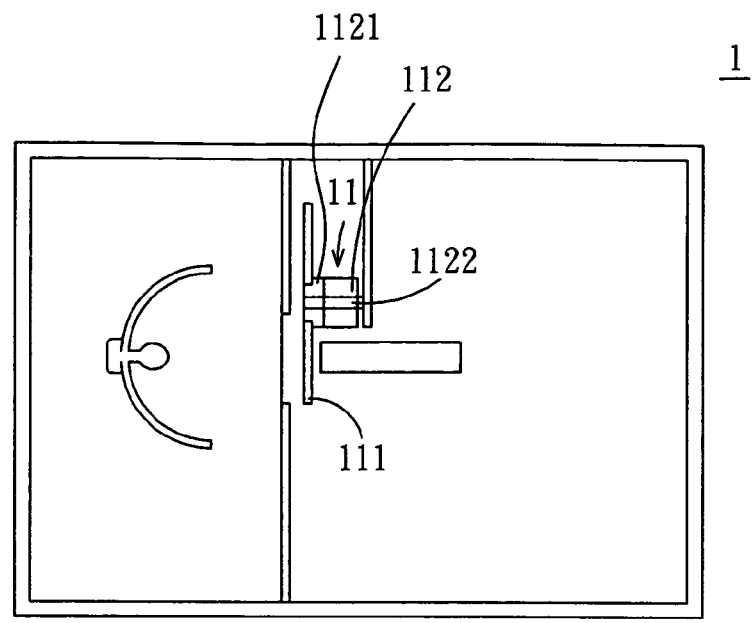
FIG. 1 is a schematic illustration that shows a conventional projection system.

The color wheel in accordance with preferred embodiments of the invention will be described with reference to the accompanying drawings.

A color wheel 2 according to an embodiment of the invention includes a motor 21, a covering element 22 and a color filter 23. The motor 21 has a housing 211 and a motor body 212. The motor body 212 has a central axis A, and the housing 211 is set at a side of the motor body 212. The housing has a surface 2111, which is opposite to the other side connecting to the motor body 212. The housing 211 and the motor body 212 rotate around a central axis A. The covering element 22 is set on the housing 211. The color filter 23 is set around the covering element 22.

In the embodiment, the motor body 212 is mainly composed of a shell (not shown), a magnetic ring (not shown), a laminated steel stack (not shown) and a coil (not shown). When the current is applied to the coil, the laminated steel stack produces a magnetic force and a magnetic field. Controlling the positive/negative property and the intensity of the flowing current may change the magnetic field in sequence, so as to produce a rotating magnetic field. Accordingly, the magnetic ring can interact with the magnetic field and thus be driven to rotate.

Figure 2:
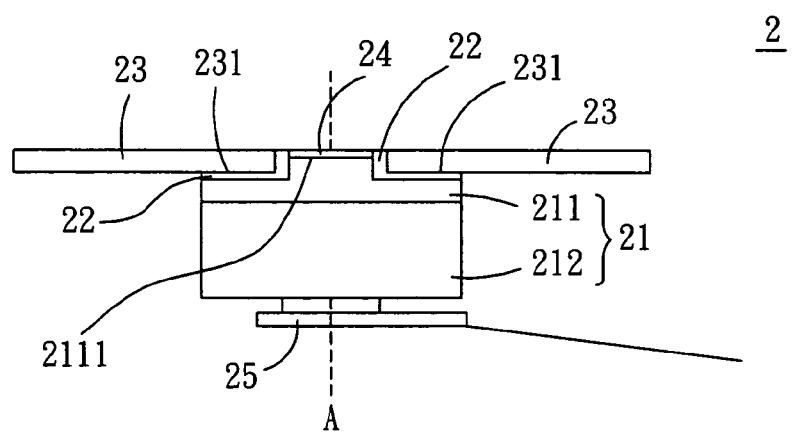
FIG. 2, FIG. 3, FIG. 4 and FIG. 5 are schematic illustrations that show cross-sectional views of a color wheel in accordance with an embodiment of the invention.
Figure 3:
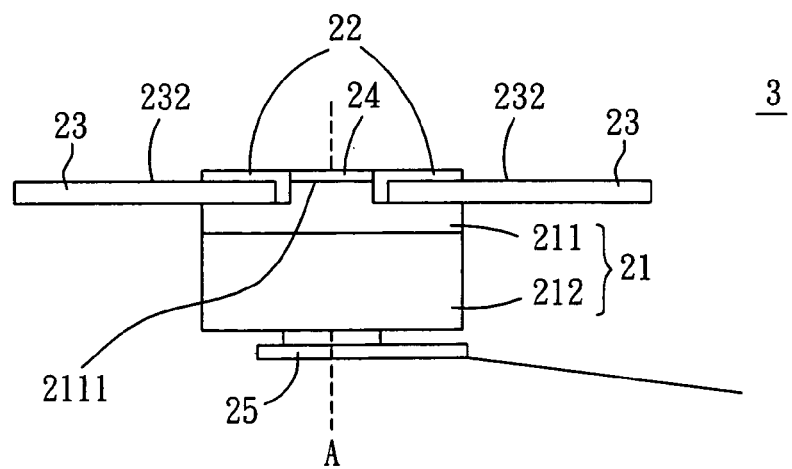

Referring to FIG. 2 and FIG. 3, the color wheel 2 further includes an absorbing element 24. The absorbing element 24 covers the surface 2111 of the housing 211. In this embodiment, the absorbing element 24 can absorb the leaking oil. In addition, the absorbing element 24 can decrease the noise transmission and absorb the motor vibration.

In addition, referring to FIG. 2 again, the covering element 22 can extend to a first surface 231 of the color filter 23 and the first surface 231 is next to the housing 211.

Referring to FIG. 3 again, the covering element 22 can extend to a second surface 232 of the color filter 23 and the second surface 232 is opposite to the first surface 231.

Figure 4:
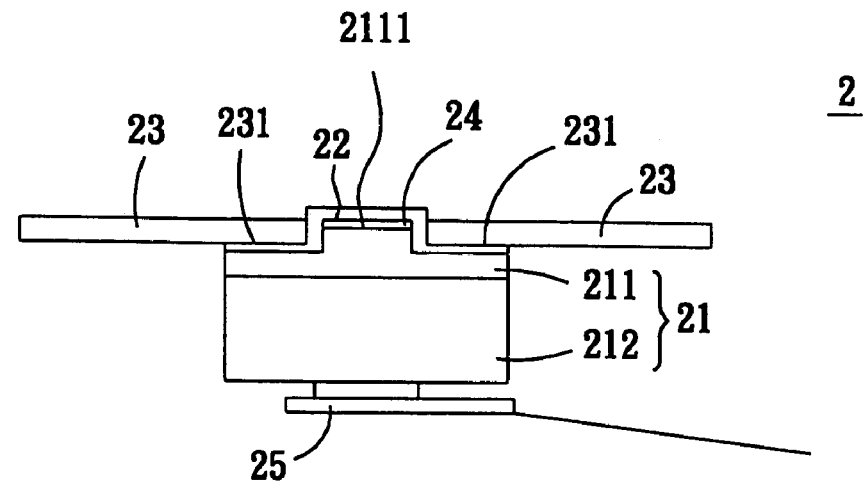
Figure 5:
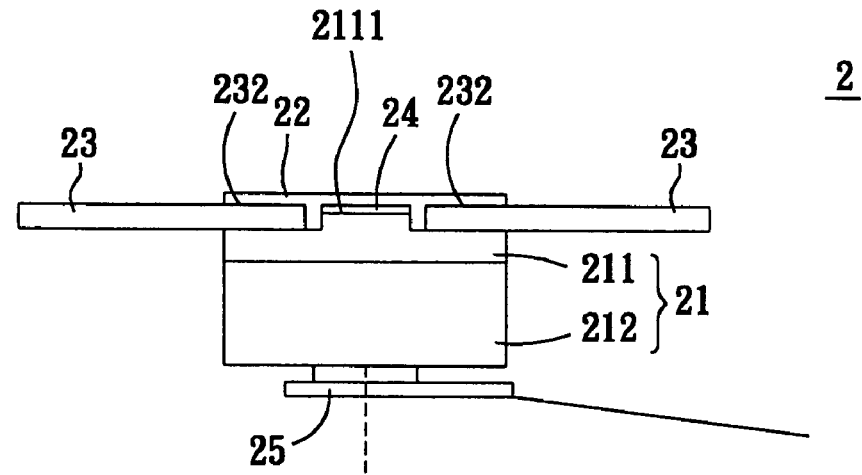

Referring to FIG. 4 and FIG. 5, the covering element 22 can cover the surface 2111 of the housing 211. Herein, an enclosed space is formed between the covering element 22 and the surface 2111 of the housing 211. In this case, the covering element 24 can be set in the enclosed space.

Herein, referring to FIG. 4, the covering element 22 can extend to the first surface 231 of the color filter 23.

In addition, referring to FIG. 5, the covering element 22 can extend to the second surface 232 of the color filter 23.

Referring to FIG. 2 and FIG. 3, the color filter 23 may be a circular filter or a ring-shaped filter composed of a red section, a green section, and a blue section. Alternatively, the color filter 23 also may be a ring-shaped filter composed of red sections, green sections and blue sections, or a circular filter composed of red sections, green sections, blue sections, and transparent sections. Of course, the color filter 23 also may be a ring-shaped transparent plate or a circular transparent plate, on which at least a red film, at least a green film, and at least a blue film are formed.

In addition, the color wheel 2 in the embodiment can further include a fixing plate 25, which fixes the color wheel 2 in a projection system (not shown).

A color wheel 3 according to another embodiment of the invention includes a motor 31, a ring-shaped cover plate 32 and a color filter 33, wherein the motor 31 has a housing 311 and a motor body 312. The motor body 312 has a central axis B. The housing 311 is set at a side of the motor body 312. The housing 311 has a surface 3111, which is opposite to the other side connecting to the motor body 312. The housing 311 and the motor body 312 rotate along a central axis B. The ring-shaped cover plate 32 is set on the housing 311. The color filter 33 is bonded to the ring-shaped cover plate 32 and the ring-shaped cover plate 32 is set between the motor 31 and the color filter 33.

Figure 6:
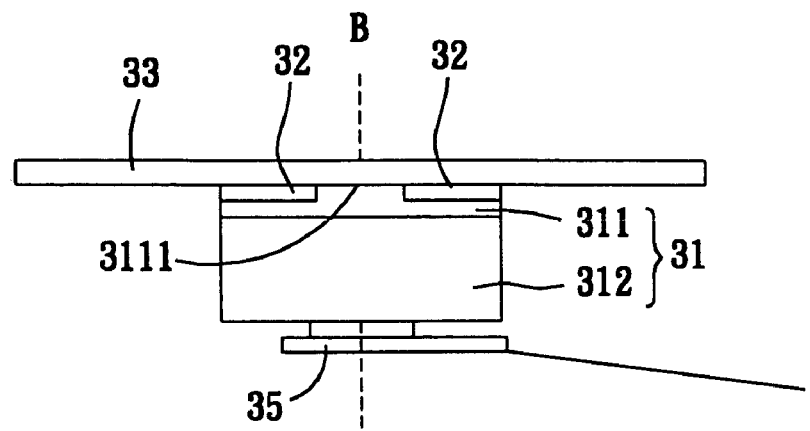
FIG. 6 and FIG. 7 are schematic illustrations that show cross-sectional views of a color wheel in accordance with another embodiment of the invention.

Referring to FIG. 6, the surface 3111 of the housing 311 is bonded to the color filter 33.

Figure 7:
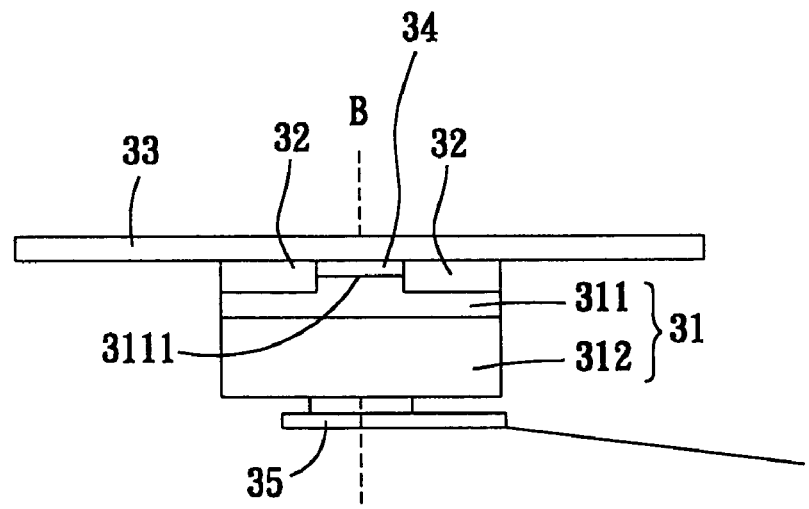

In addition, referring to FIG. 7, an enclosed space is formed between the surface 3111 of the housing 311 and the color filter 33.

Besides, referring to FIG. 7 again, the color wheel 3 in this embodiment further includes an absorbing element 34 and the absorbing element 34 can be set in the enclosed space. In this embodiment, the absorbing element 34 can absorb the leaking oil. Furthermore, the absorbing element 34 can also decrease the noise transmission and absorb the motor vibration.

The color filter 33 is circular. Thus, the color filter 33 can be a circular filter composed of a red sector, a green sector and a blue sector. Alternatively, the color filter 33 also can be a circular filter composed of red sections, green sections, and blue sections. Or, the color filter 33 can be a circular filter composed of red sections, green sections, blue sections, and transparent sections. Of course, the color filter 33 also can be a circular transparent plate, on which at least a red film, at least a green film, and at least a blue film are formed.

In addition, the color wheel 3 can further include a fixing plate 35.

The features and the functions of the elements in this embodiment are the same to those in the previously mentioned embodiment, so the detailed descriptions thereof are omitted for concise purpose.

As mentioned above, the color wheel of the invention has a covering element or a ring-shaped cover plate, which can prevent oil leaking onto the color filter to influence the normal operation of the color wheel and to affect the image quality. In addition, the absorbing element in the invention can ensure that the oil of the motor would not leak unto the color filter. Therefore, the invention can ensure the reliability of the color wheel and the image quality of the projection system.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A color wheel, comprising:
    a motor including a housing and a motor body, the motor body having a central axis, the housing being set at one side of the motor body, the housing having a surface opposite to where the housing is set at the side of the motor body, and the housing and the motor body rotating around a central axis;
    a covering element, which covers one part of the housing of the motor, wherein the covering element covers the surface of the housing; and
    a ring-shaped color filter which is set around the covering element, wherein an inner surface of the ring-shaped color filter connects with the covering element, an enclosed space is formed between the covering element and the surface of the housing, and the central axis passes through the enclosed space.

2. The color wheel according to claim 1, further comprising an absorbing element set in the enclosed space.

3. The color wheel according to claim 1, further comprising an absorbing element covering the surface of the housing.

4. The color wheel according to claim 1, wherein the covering element extends to a first surface of the color filter and the first surface is next to the housing.

5. The color wheel according to claim 1, wherein the color filter has a first surface and a second surface opposite to the first surface, the first surface is next to the housing, and the covering element extends to the second surface of the color filter.

6. A color wheel, comprising:
- a motor including a housing and a motor body, the motor body having a central axis, the housing being set at one side of the motor body, the housing having a surface opposite to where the housing is set at the side of the motor body, and the housing and the motor body rotating around a central axis;
- a ring-shaped covering plate, which covers one part of the housing of the motor; and
- a color filter, which is connected to the ring-shaped covering plate, the ring-shaped covering plate being set between the motor and the color filter, wherein the color filter is circular, and covers the ring-shaped covering plate and another part of the housing, an enclosed space is formed between the surface of the housing and the color filter, and the central axis passes through the enclosed space.

7. The color wheel according to claim 6, wherein the surface of the housing is bonded to the color filter.

8. The color wheel according to claim 6, further comprising an absorbing element set in the enclosed space.

* * * * *